Figure 3:
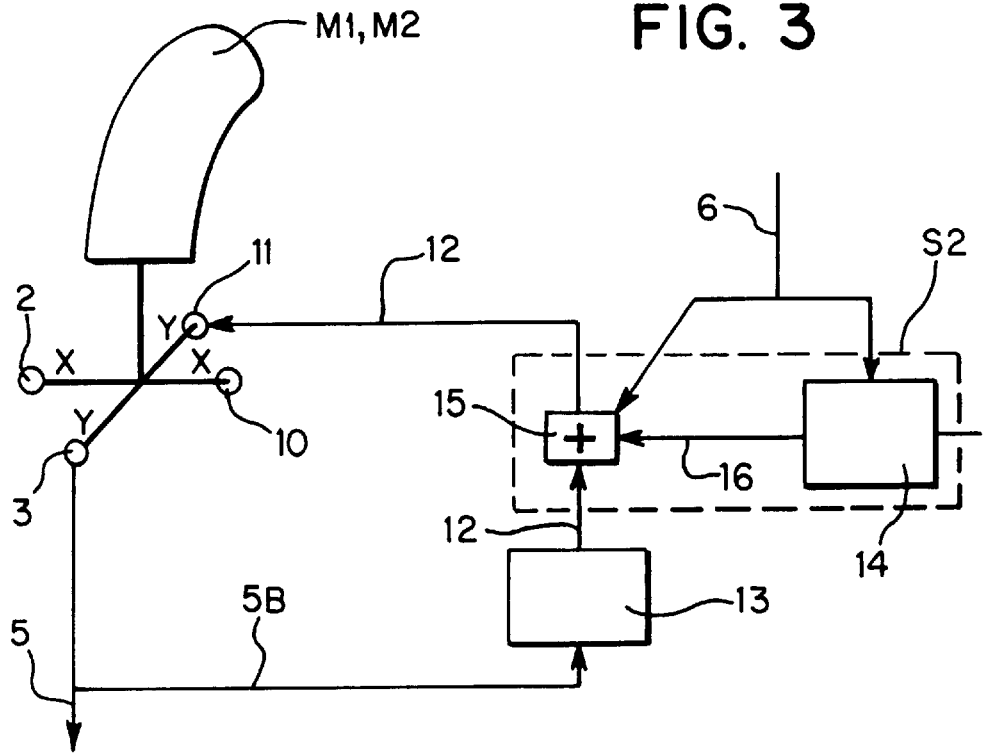

United States Patent
Todeschi et al.

[19]

[11] Patent Number: 6,000,662
[45] Date of Patent: Dec. 14, 1999

[54] FLYING AID DEVICE FOR A FLY-BY-WIRE AIRCRAFT

[75] Inventors: Michel Todeschi, Colomiers; Laurent Andrieu, Aucamville; Cécile Vollard, Toulouse; Jean-Claude Perie, Grenade, all of France

[73] Assignee: Aerospatial Societe Nationale Industrielle, Paris, France

[21] Appl. No.: 08/950,366

[22] Filed: Oct. 14, 1997

[30] Foreign Application Priority Data

Oct. 14, 1996 [FR] France ................................. 96 12482

[51] Int. Cl.⁶ ........................... B64C 13/04; B64C 13/12; B64C 13/50
[52] U.S. Cl. ........................... 244/223; 244/220; 244/228; 244/229
[58] Field of Search .................................. 244/220, 221, 244/223, 228, 229, 236; 340/965; 318/564

[56] References Cited

U.S. PATENT DOCUMENTS

| | | | |
|---|---|---|---|
| 2,566,409 | 9/1951 | Greene | 340/965 |
| 5,062,594 | 11/1991 | Repperger | 244/223 |
| 5,125,602 | 6/1992 | Vauvelle | 244/223 |
| 5,149,023 | 9/1992 | Sakurai et al. | 244/229 |
| 5,291,113 | 3/1994 | Hegg et al. | 244/220 |
| 5,456,428 | 10/1995 | Hegg | 244/229 |
| 5,694,014 | 12/1997 | Hegg et al. | 318/564 |

FOREIGN PATENT DOCUMENTS

| | | |
|---|---|---|
| 0 204 598 | 5/1986 | European Pat. Off. . |
| 0 384 806 | 2/1990 | European Pat. Off. . |
| 1 476 402 | 6/1974 | United Kingdom . |

OTHER PUBLICATIONS

Hegg, J.W. et al., Digital Avionics Systems Conference. No. Conf. 13, Oct. 30, 1994 pp. 305 to 308, (Hegg et al.).

*Primary Examiner*—Charles T. Jordan
*Assistant Examiner*—Charles R Ducker, Jr.
*Attorney, Agent, or Firm*—Fisher, Christen & Sabol

[57] ABSTRACT

A flying aid device for a fly-by-wire aircraft which has at least two mechanically independent control columns (M1, M2). The device (1) includes: a system (SO) for detecting multiple control corresponding to simultaneous operation of at least two of the control columns (M1, M2); and informing systems (S1, S2, S3, S4), each of which is associated with one of the control columns (M1, M2) and is intended to generate within the control column (M1, M2), when the detection system (SO) detects multiple control, a tactile sensation that informs a pilot of the aircraft who is operating the control column (M1, M2) of the multiple control.

21 Claims, 2 Drawing Sheets

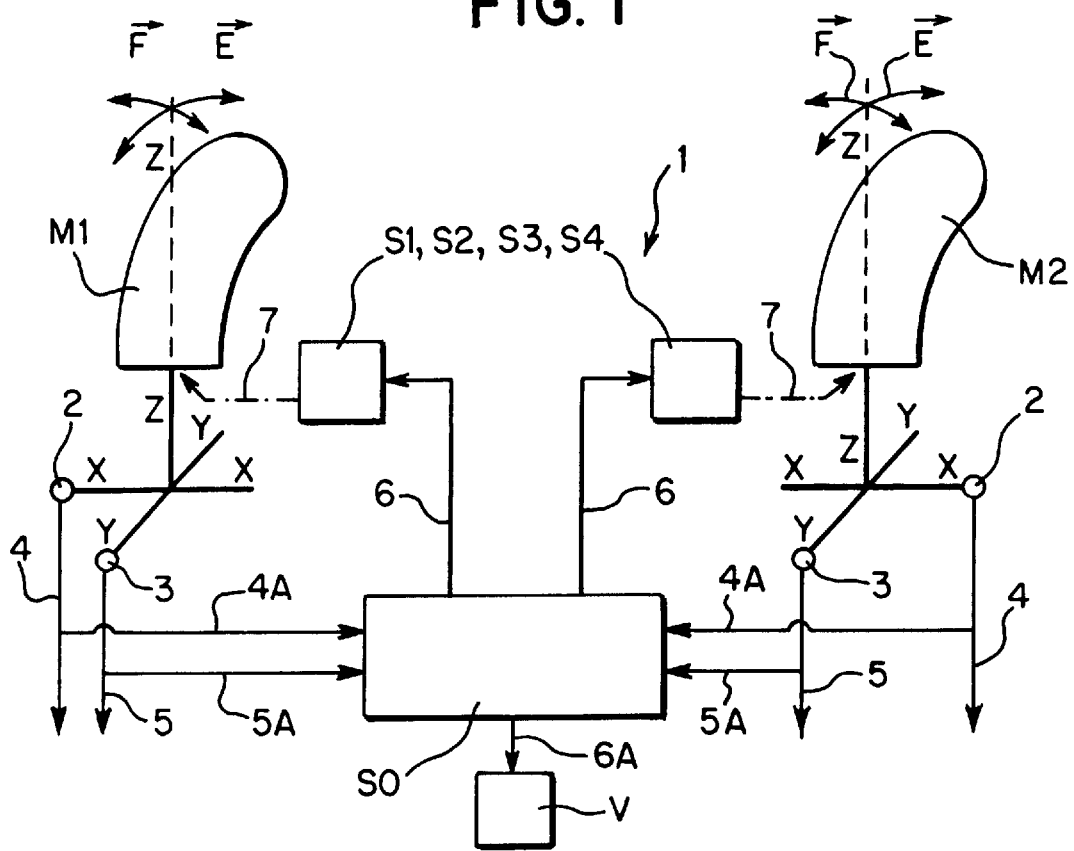
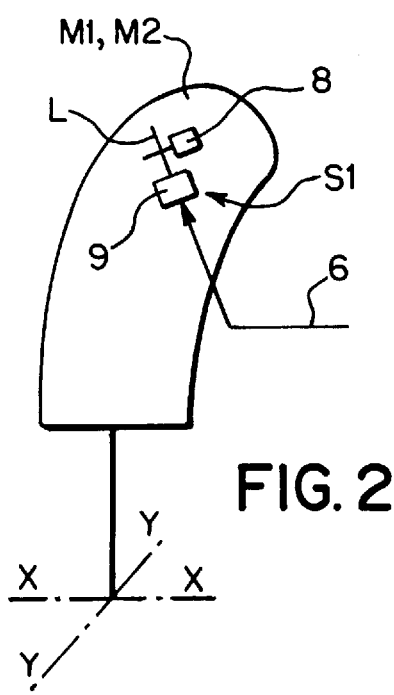
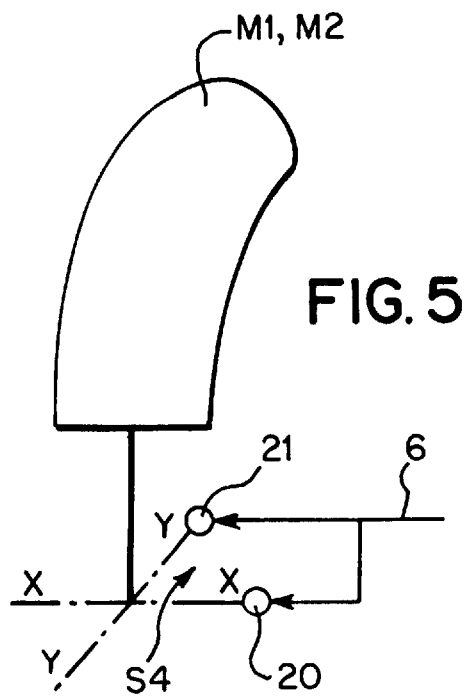

FLYING AID DEVICE FOR A FLY-BY-WIRE AIRCRAFT

The present invention relates to a flying aid device for a fly-by-wire aircraft.

Although not exclusively, the invention is more particularly applicable to an aircraft, for example a civil transport airplane, which has a pilot's control column and a copilot's control column which are mechanically independent of each other. In the known way, each of said control columns can generally be pivoted about two control axes for controlling the roll and the pitching of the aircraft respectively.

It is also known that in the cockpit of such an aircraft, the roles are perfectly defined so that in theory just one pilot (either the pilot or the copilot) has control of the aircraft and operates his control column.

However, it can happen, especially during difficult maneuvers or complicated flying situations in which the attention of said pilots is essentially focused on the operations to be carried out, that both pilots operate their control column at the same time, this resulting in dual control generating different or even contradictory flight commands.

To avoid such a situation which is liable to have damaging consequences, it is necessary for the pilots to be able rapidly to recognize any dual control. Usually, for control columns which are not mechanically coupled, that is to say whose movements are independent of one another, as is envisaged in the present invention, one of the pilots recognizes dual control:

either visually, by watching the other pilot's control column, monitor screens or visual indicators;

or by analyzing the behavior of the aircraft or of various systems mounted on the aircraft.

Such usual solutions are not fully satisfactory because:

they are not accurate;

they depend entirely on the pilots' observations;

they distract the gaze and attention of these pilots from the tasks or operations they are in the process of doing; and what is more, they require constant attention.

The object of the present invention is to overcome these drawbacks. The present invention relates to a flying aid device which makes it possible to indicate accurately and unequivocally, to the pilots of an aircraft that multiple control, for example dual control, is occurring, without in so doing distracting their attention from flying or from the maneuvers that need to be carried out.

For this, according to the invention, said device is noteworthy in that it comprises:

a system for detecting multiple control corresponding to simultaneous operation of at least two of said control columns; and informing systems, each of which is associated with one of said control columns and is intended to generate within said control column, when said detection system detects multiple control, a tactile sensation that informs a pilot of the aircraft who is operating said control column of the multiple control.

Thus, by virtue of the invention, the pilots of the aircraft are informed of any multiple control as appropriate accurately and unequivocally by a tactile sensation felt in the control column they are operating, particularly if there is any dual control in cases where flying is by two pilots.

The result of this is that said pilots are able quickly and exactly to evaluate the current situation and take the required steps without in any way distracting their attention from the operations which they may be in the process of carrying out.

In addition, as will be seen hereinbelow from a number of embodiments, the device in accordance with the invention can be applied to existing control columns of the usual type, and this of course reduces the cost of said flying aid device.

The present invention preferably applies to an aircraft comprising a calculation unit which formulates aircraft flight commands from electrical signals the value of which depends on the positions of said control columns, which positions can be altered by operating these control columns.

In this case, said detection system advantageously detects said electrical signals and, as a function of the value of these electrical signals, determines where the multiple control is occurring.

Furthermore, in accordance with the invention, the informing systems may be produced in various embodiments specified hereinbelow.

In a first, particularly advantageous embodiment of the invention and which can be applied to any aircraft of the aforementioned type, at least one of said informing systems comprises a vibrator unit built into the associated control column and causing said control column to vibrate when multiple control is occurring.

In this case, advantageously:

said vibrator unit comprises a flyweight that can be rotated by an electric motor; and the amplitude and frequency of said vibrations are adjusted as a function of the rotational speed of said electric motor and the mass of said flyweight.

Furthermore, second and third embodiments of the informing systems are each applicable to an aircraft which has control columns liable to be operated or pivoted at least about one control axis and each of which comprises at least one electric motor which as a function of a control signal generates force sensations which are felt when said control column is operated about said control axis.

In such an aircraft, at least one of said informing systems comprises:

in said second embodiment, an electrical-signal generator which generates a sinusoidal electrical signal, said sinusoidal electrical signal being superposed, when multiple control is occurring, with said signal controlling the electric motor in such a way that said electric motor then, in addition to generating said force sensations, causes said control column to vibrate; and in said third embodiment, a gain generator which generates a gain, the signal for controlling said electric motor being multiplied by said gain, when multiple control is occurring, so as to cause a change to said force sensations felt when operating the corresponding control column.

In this case, said gain is preferably calculated from the expression (1+x), in which:

x is zero when just one at most of said control columns is being operated;

x is between 0 and −1 when at least two control columns are operated simultaneously and in the same direction; and x is between 0 and +1 when at least two control columns are being operated simultaneously but in contrary directions.

Furthermore, in a fourth embodiment, at least one of said informing systems comprises an active member which when multiple control is occurring causes force sensations which are felt when the corresponding control column is operated, the force sensations felt on one control column varying as a function of the position of another control column.

Of course, when the control columns can be operated about two different control axes, as is generally the case when flying an aircraft, for controlling the roll and the pitching respectively, each informing system in question comprises:

in said third embodiment, two gain generators; and in said fourth embodiment, two active members.

It will be noted that such duplication is not necessary when the control columns are made to vibrate, such as in the second aforementioned embodiment, for example.

Furthermore, for the pilots to be better informed in the event of multiple control, the device in accordance with the invention additionally comprises a display means capable of indicating multiple control using characteristic signs.

The figures of the appended drawing will make it easy to understand how the invention may be achieved. In these figures, identical references denote similar elements.

FIG. 1 diagrammatically illustrates a flying aid device in accordance with the invention.

FIGS. 2 to 5 diagrammatically show informing systems of a flying aid device in accordance with the invention, in first, second, third, and fourth embodiments, respectively.

The flying aid device 1 in accordance with the invention and depicted diagrammatically in FIG. 1 is intended to be mounted on an aircraft, for example a civil transport airplane which has a pilot's control column M1 and a copilot's control column M2.

Said control columns M1 and M2 are produced in the form of grips that can be operated by hand by the pilot and the copilot of the aircraft, respectively.

In order to fly said aircraft controlling its pitching and its roll, said control columns M1 and M2 which, when in the position of rest, are directed longitudinally along an axis Z—Z can be maneuvered:

on the one hand, forward and back, as indicated by a double-headed arrow $\vec{E}$ in FIG. 1, so as to pivot about an axis X—X, which allows control over the pitching of the aircraft; and on the other hand, to the right and to the left, as indicated by a double-headed arrow $\vec{F}$, so as to pivot about an axis Y—Y, which makes it possible to control the roll of the aircraft.

As is known, each of said control columns M1 and M2 is associated with sensors 2 and 3 which detect the position of the corresponding control column, with respect to the position of rest about the control axes X—X and Y—Y, respectively, and detect the rate of operation of said control column.

This information is transmitted, down lines 4 and 5 respectively, in the form of electrical signals, to a control unit, not depicted, which from these electrical signals formulates flight commands transmitted to the flight-control devices of the aircraft, which are also not depicted.

The control columns M1 and M2, under consideration in this invention, are also mechanically uncoupled from one another which means that operating one of said control columns M1 and M2 does not bring about a similar following movement in the other control column M2 or M1.

There is therefore a possibility that the pilot and the copilot might both simultaneously operate their control columns M1 and M2, and additionally do so differently, or even in opposition to each other. To avoid such a problem, the flying aid device 1 in accordance with the invention is intended to indicate to the pilot and to the copilot any multiple control, in this case any dual control, corresponding to simultaneous operation of both control columns M1 and M2.

To do this, said device 1 comprises, as depicted in FIG. 1:

a system SO for detecting dual control. Said system SO, which is produced in the form of a calculation unit, receives via lines 4A and 5A connected respectively to the lines 4 and 5, the electrical signals emitted by the sensors 2 and 3 of the two control columns M1 and M2 and, as a function of the value of these electrical signals, determines whether or not there is dual control; and two identical informing systems which are produced according to one of embodiments S1 to S4 depicted respectively in FIGS. 2 to 5, which are connected via lines 6 to the detection system SO associated respectively with said control columns M1 and M2 and intended to cause, in said control columns M1 and M2, as indicated by lines 7, when said detection system SO detects dual control, a tactile sensation which informs said pilot and said copilot, respectively, of the dual control.

Thus by virtue of the invention, when there is dual control, the pilot and the copilot are informed of the dual control directly and unequivocally by the tactile sensation they feel in their control columns M1 and M2, which allows them to take steps appropriate to this situation.

In addition, this method of indicating in accordance with the invention does not distract the concentration of the pilot and of the copilot from the operations they are in the process of carrying out.

In order to improve the indication of dual control, the device 1 additionally comprises a display means V, for example a screen, connected by a line 6A to the detection system SO and indicating any dual control using characteristic signals, not depicted.

According to the invention, said tactile sensation corresponds:

either to characteristic vibration generated in said control columns M1 and M2 as is the case for the embodiments specified hereinbelow, with reference to FIGS. 2 and 3;

or to force sensations due to resistance of the control columns to operation, as is the case for the embodiments specified hereinbelow with reference to FIGS. 4 and 5.

It will be noted that in FIGS. 2 to 5, in order to simplify the drawing, just one of the two said informing systems (associated with one of said control columns M1, M2) has been depicted each time, the other being produced identically.

However, it will be noted that it is also envisageable, within the scope of the present invention, to provide a flying aid device 1 that comprises two informing systems obtained using different embodiments.

In a first embodiment depicted diagrammatically in FIG. 2, said informing system S1 comprises a vibrator unit arranged in the control column M1 or M2 close to the region where the latter is gripped and comprising:

a flyweight 8 that can be rotated about an axis L; and an electric motor 9 capable of rotating said flyweight 8 about said axis L.

Thus, by rotating about the axis L, the flyweight 8, through an imbalance effect, causes vibration in the control column M1 or M2 and this vibration is felt by the pilot or the copilot.

The amplitude and frequency of the vibration thus generated (which may be continuous or discontinuous depending on the information to be transmitted) can be adjusted by altering the rotational speed of the electric motor 9 and/or the mass of the flyweight 8, and this makes it possible to generate characteristic vibrations, that is to say vibrations which have:

a given frequency known to the pilots; and an appropriate amplitude, that is to say an amplitude which is not so high that it hampers the pilots in their maneuvers, but is high enough for the vibration to be perfectly noticeable to these pilots.

Furthermore, it will be noted that the embodiment of FIG. 3 applies to an aircraft which has electric motors 10 and 11 of a known type associated with the control column M1 or M2 linked in with the pivoting of the control column M1 or M2 respectively about the control axes X—X and Y—Y and generating force sensations as said control column is pivoted about one of said axes X—X and Y—Y, these sensations being felt as resistance to operation.

Said electric motor 11 acts as a function of an electrical signal received via a line 12 from a control unit 13.

Said control unit 13 is connected by a line 5B to the line 5, at the output from the sensor 3 and it formulates the electrical signal for controlling the electric motor 11 as a function of information received from the sensor 3 and in particular as a function of the position of the control column M1 or M2.

More specifically, the resistance to operation of the control column M1 or M2 which is generated by the electric motor 11 depends on the distance that said control column is from its position of rest: the further away it is, the greater the resistance.

A control unit, identical to the control unit 13, and not depicted, is associated in the same way with the electric motor 10 and with the sensor 2 for pivoting about the axis X—X.

In this case, each of said informing systems S2 comprises, according to the invention:

an electrical-signal generator 14 which generates a sinusoidal electrical signal; and a calculation element 15 connected to the generator 14 by a line 16, mounted in the line 12 and controlled by the detection system SO via the line 6.

According to the invention, said calculation element 15 is controlled by said detection system SO in such a way that when there is dual control it superposes on the control signal for the electric motor 11 formed by the control unit 13, the sinusoidal electrical signal formed by the generator 14, in such a way that said electric motor 11 then, in addition to said force sensations, causes said control column M1 or M2 to vibrate.

Of course the amplitude and frequency of the vibration thus generated can be adjusted by changing the amplitude and frequency of said electrical signal.

It will also be noted:

that said informing system S2 can also be applied to the control unit for the motor 10; but that just one informing system S2 of this type per control column M1 or M2 will suffice.

Figure 4:
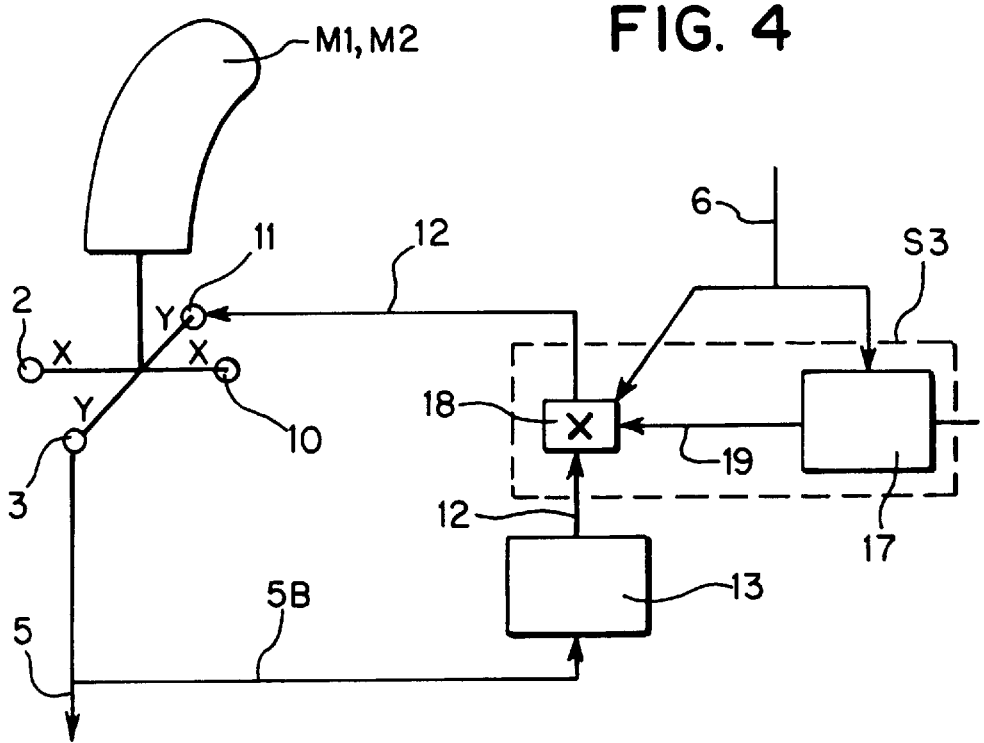

The embodiment of FIG. 4 applies to a control column M1 or M2 identical to the one in FIG. 3 and described earlier.

In this case, each of said informing systems S3 comprises a collection of elements associated with each control axis X—X or Y—Y and each comprises, as depicted only for the control axis Y—Y:

a gain generator 17 which generates a gain specified hereinbelow; and a calculation element 18 connected to the generator 17 by a line 19, mounted in the line 12 and controlled by the detection system SO via the line 6.

According to the invention, said calculation element 18 is controlled by said detection system SO in such a way that when there is dual control, the control signal for the electric motor 11 formed by the control unit 13 is multiplied by the gain formed by the generator 17 so as then to alter said force sensations felt when the corresponding control column M1 or M2 is operated.

As a preference, said gain is calculated by the generator 17 from the expression (1+x), in which:

x is zero, when at most one of said control columns M1 and M2 is operated;

x is between 0 and −1 when both control columns M1 and M2 are operated in the same direction; and x is between 0 and +1 when both control columns M1 and M2 are operated in contrary directions.

Thus by virtue of said informing system S3:

the usual tactile sensations are unaltered so long as no dual control is detected (gain=1);

the tactile sensations are altered so as to obtain reduced resistance to operation when the two control columns M1 and M2 are operated in the same direction (gain<1); and the tactile sensations are altered to obtain increased resistance to operation when the two control columns M1 and M2 are operated in contrary directions (gain>1).

Furthermore, in the embodiment of FIG. 5, each of said informing systems S4 comprises active members 20 and 21, for example electric motors, which are associated respectively with the control axes X—X and Y—Y and which when there is dual control, generate force sensations which are felt when the control column M1 or M2 is operated about the corresponding control axis, these sensations being in the form of resistance to operation.

In addition, according to the invention, the force sensations felt for a control column, for example M1, vary as a function of the position of the other control column, for example M2, about the same control axis.

What is claimed is:

1. A flying aid device for a fly-by-wire aircraft which has at least two mechanically independent control columns (M1, M2), it being possible for each of said control columns (M1, M2) to be operated to fly said aircraft, which device comprises:

a system (SO) for detecting multiple control corresponding to simultaneous operation of at least two of said control columns (M1, M2); and informing systems (S1, S2, S3, S4), each of which is associated with one of said control columns (M1, M2) and is intended to generate within said control column (M1, M2), when said detection system (SO) detects multiple control, a tactile sensation that informs a pilot of the aircraft who is operating said control column (M1, M2) of the multiple control, wherein at least one of said informing systems (S4) comprises an active member (20, 21) which, when multiple control is occurring, causes force sensations, the force sensations felt on one control column (M1, M2) varying as a function of the position of another control column.

2. The device as claimed in claim 1, said aircraft comprising a calculation unit which formulates aircraft flight commands from electrical signals the value of which depends on the positions of said control columns (M1, M2), which positions can be altered by operating these control columns, wherein said detection system (SO) detects said electrical signals and, as a function of the value of these electrical signals, determines where the multiple control is occurring.

3. The device as claimed in claim 1, wherein at least one of said informing systems (S1) comprises a vibrator unit (8, 9) built into the associated control column (M1, M2) and causing said control column (M1, M2) to vibrate when multiple control is occurring.

4. The device as claimed in claim 3, wherein said vibrator unit comprises a flyweight (8) that can be rotated by an electric motor (9).

5. The device as claimed in claim 4, wherein the amplitude and frequency of said vibrations are adjusted as a function of the rotational speed of said electric motor (9) and the mass of said flyweight (8).

6. The device as claimed in claim 1, it being possible for each of said control columns (M1, M2) to be operated about two control axes (X—X, Y—Y), wherein at least one of said informing systems (S4) comprises two members (20, 21), each one associated with one of said control axes (X—X, Y—Y).

7. The device as claimed in claim 1, which comprises a display means (V) connected to said detection system (SO) and intended, using characteristic signs, to indicate any multiple control.

8. A flying aid device for a fly-by-wire aircraft which has at least two mechanically independent control columns (M1, M2), it being possible for each of said control columns (M1, M2) to be operated to fly said aircraft, each of which is liable to be operated at least about one control axis (X—X, Y—Y) and comprises at least one electric motor (10, 11) which as a function of a control signal generates force sensations which are felt when said control column (M1, M2) is operated about said control axis (X—X, Y—Y), which device comprises:

a system (SO) for detecting multiple control corresponding to simultaneous operations of at least two of said control columns (M1, M2); and informing systems (S1, S2, S3, S4), each of which is associated with one of said control columns (M1, M2) and is intended to generate within said control column (M1, M2), when said detection system (SO) detects multiple control, a tactile sensation that informs a pilot of the aircraft who is operating said control column (M1, M2) of the multiple control, wherein at least one of said informing systems (S2) comprises an electrical-signal generator (14) which generates a sinusoidal electrical signal, said sinusoidal electrical signal being superposed, when multiple control is occurring, with said signal controlling the electric motor (11) in such a way that said electric motor (11) then, in addition to generating said force sensations, causes said control column (M1, M2) to vibrate.

9. The device as claimed in claim 8, said aircraft comprising a calculation unit which formulates aircraft flight commands from electrical signals the value of which depends on the positions of said control columns (M1, M2), which positions can be altered by operating these control columns, wherein said detection system (SO) detects said electrical signals and, as a function of the value of these electrical signals, determines where the multiple control is occurring.

10. The device as claimed in claim 8, wherein at least one said informing systems (S1) comprises a vibrator unit (8,9) built into the associated control column (M1, M2) and causing said control column (M1, M2) to vibrate when multiple control is occurring.

11. The device as claimed in claim 8, wherein at least one of said informing systems (S3) comprises a gain generator (17) which generates a gain, the signal for controlling said electric motor (11) being multiplied by said gain, when multiple control is occurring, so as to cause a change to said force sensations felt when operating the corresponding control column (M1, M2) about said control axis (X—X, Y—Y).

12. The device as claimed in claim 8, wherein it is possible for each of said control columns (M1, M2) to be operated at least about one control axis (X—X, Y—Y) and the force sensations felt on one control column (M1, M2) varying as a function of the position of another control column.

13. The device as claimed in claim 8, which comprises a display means (V) connected to said detection system (SO) and intended, using characteristic signs, to indicate any multiple control.

14. A flying aid device for a fly-by-wire aircraft which has at least two mechanically independent control columns (M1, M2), it being possible for each of said control columns (M1, M2) to be operated to fly said aircraft, each of which is liable to be operated at least about one control axis (X—X, Y—Y) and comprises at least one electric motor (10, 11) which as a function of a control signal generates force sensations which are felt when said control column (M1, M2) is operated about said control axis (X—X, Y—Y), which device comprises:

a system (SO) for detecting multiple control corresponding to simultaneous operation of at least two of said control columns (M1, M2); and informing systems (S1, S2, S3, S4), each of which is associated with one of said control columns (M1, M2) and is intended to generate within said control column (M1, M2), when said detection system (SO) detects multiple control, a tactile sensation that informs a pilot of the aircraft who is operating said control column (M1, M2) of the multiple control, wherein at least one of said informing systems (S3) comprises a gain generator (17) which generates a gain, the signal for controlling said electric motor (11) being multiplied by said gain, when multiple control is occurring, so as to cause a change to said force sensations felt when operating the corresponding control column (M1,,M2) about said control axis (X—X, Y—Y).

15. The device as claimed in claim 14, said aircraft comprising a calculation unit which formulates aircraft flight commands from electrical signals the value of which depends on the positions of said control columns (M1, M2), which positions can be altered by operating these control columns, wherein said detection system (SO) detects said electrical signals and, as a function of the value of these electric signals, determines where the multiple control is occurring.

16. The device as claimed in claim 14, wherein at least one of said informing systems (S1) comprises a vibrator unit (8,9) built into the associated control column (M1, M2) and causing said control column (M1, M2) to vibrate when multiple control is occurring.

17. The device as claimed in claim 14, wherein at least one said informing systems (S2) comprises an electrical-signal generator (14) which generates a sinusoidal electrical signal, said sinusoidal electrical signal being superposed, when multiple control is occurring, with said signal controlling the electric motor (11) in such a way that said electric motor (11) then, in addition to generating said force sensations, causes said control column (M1, M2) to vibrate.

18. Device as claimed in claim 14, it being possible for each of said control columns (M1, M2) to be operated about two control axes (X—X, Y—Y) and each of said control columns comprising two electric motors (10, 11) associated respectively with said control axes (X—X, Y—Y), wherein at least one of said informing systems (S3) has two gain generators (17), one associated with each of said electric motors (10, 11).

19. The device as claimed in claim 14, wherein said gain is calculated from the expression (1+x), in which:

x is zero when just one at most of said control columns (M1, M2) is being operated:

x is between 0 and −1 when at least two control columns (M1, M2) are operated simultaneously and in the same direction; and x is between 0 and +1 when at least two control columns (M1, M2) are being operated simultaneously but in contrary directions.

20. The device as claimed in claim 14, wherein it is possible for each of said control columns (M1, M2) to be operated at least about one control axis (X—X, Y—Y) and the force sensations felt on one control column (M1, M2) varying as a function of the position of another control column.

21. The device as claimed in claim 14, which comprises a display means (V) connected to said detection system (SO) and intended, using characteristic signs, to indicate any multiple control.

* * * * *